J. WILLIS.
SAND GRADING APPARATUS FOR GLASS GRINDING MACHINERY.
APPLICATION FILED FEB. 15, 1917.
1,342,038.
Patented June 1, 1920.
2 SHEETS—SHEET 1.
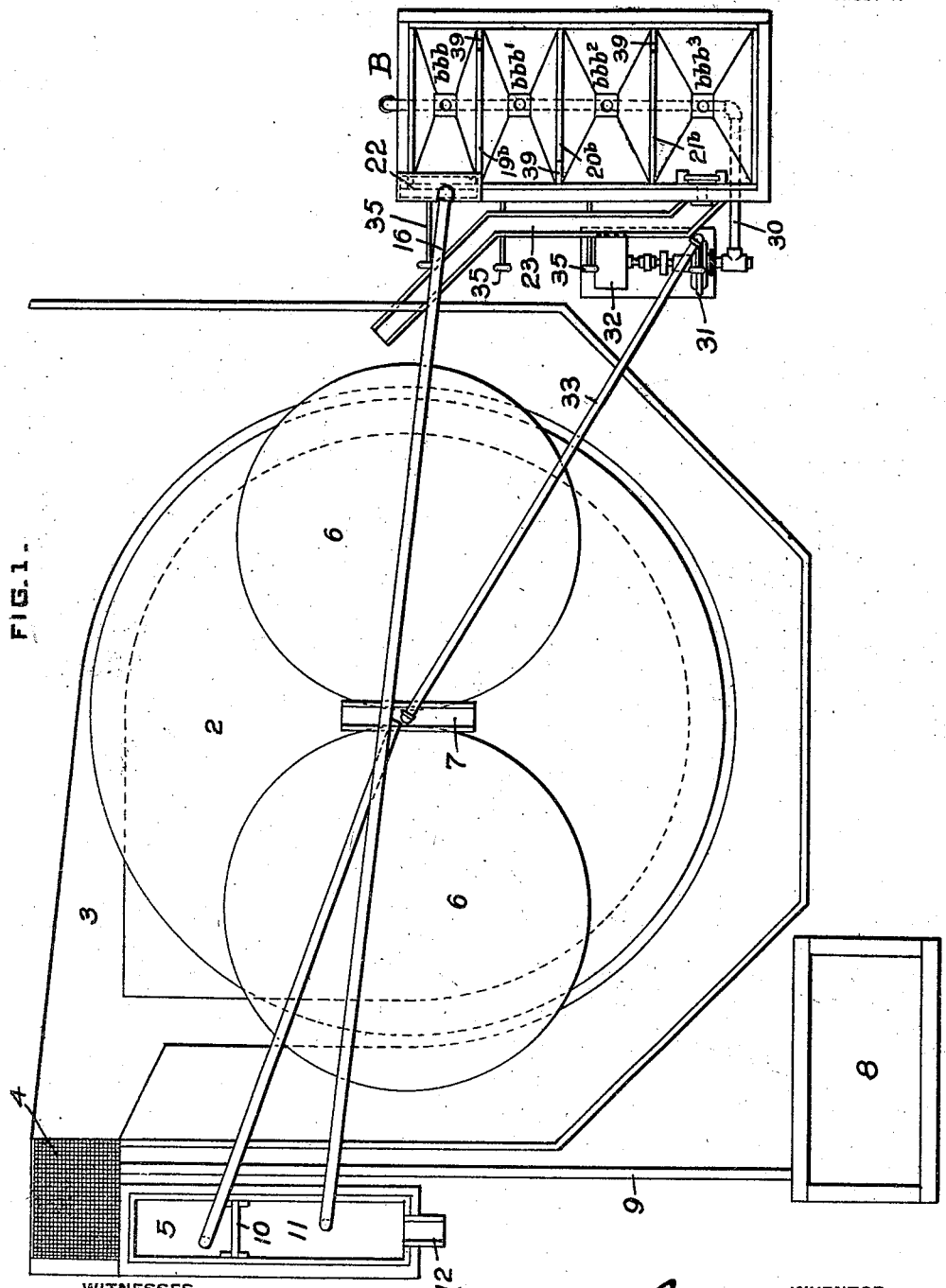
WITNESSES
INVENTOR

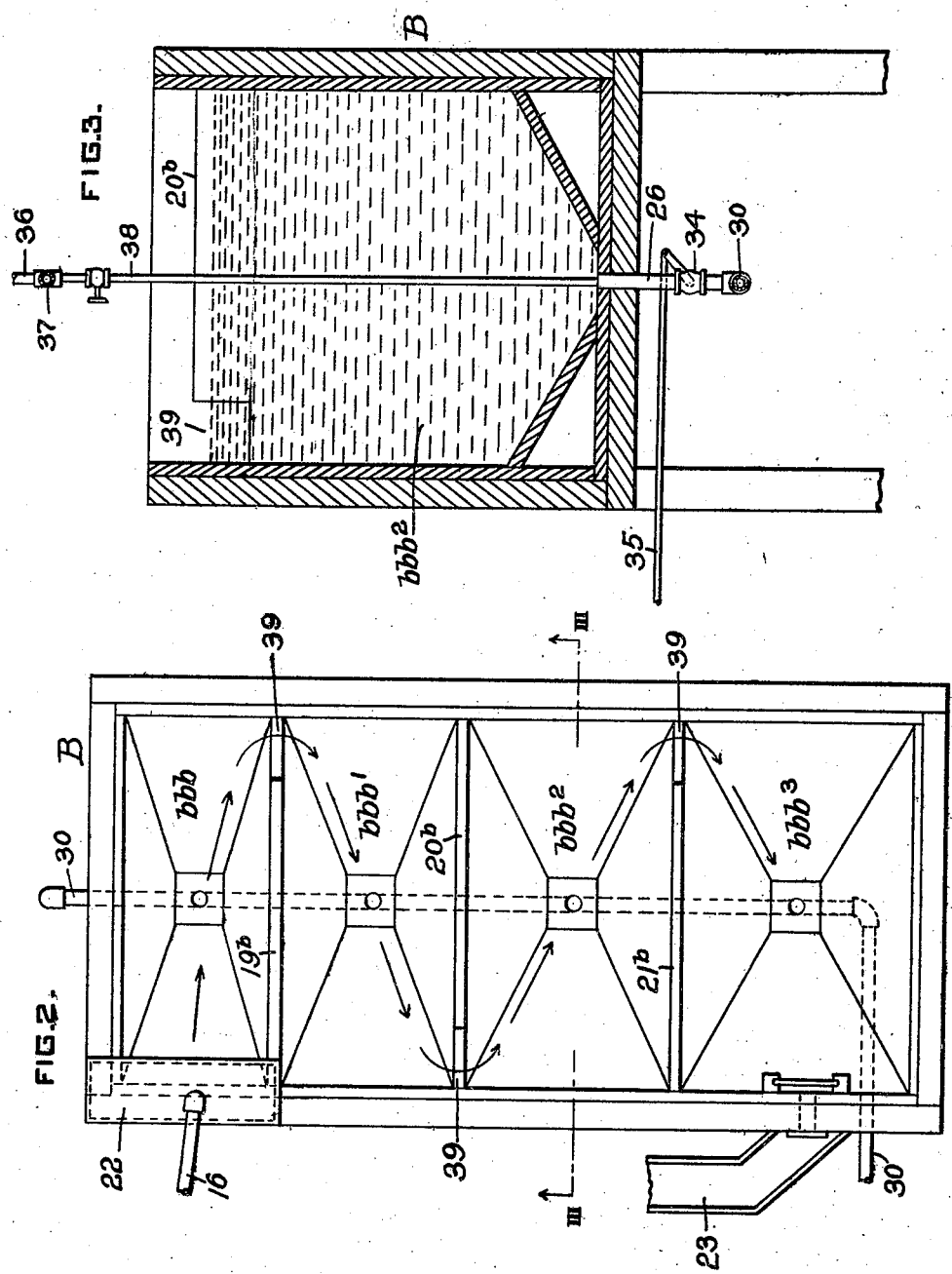

UNITED STATES PATENT OFFICE.

JOHN WILLIS, OF KANE, PENNSYLVANIA, ASSIGNOR TO AMERICAN PLATE GLASS COMPANY, OF KANE, PENNSYLVANIA, A CORPORATION OF NEW JERSEY.

SAND-GRADING APPARATUS FOR GLASS-GRINDING MACHINERY.

1,342,038.  Specification of Letters Patent.  Patented June 1, 1920.

Original application filed October 18, 1915, Serial No. 56,343. Patent No. 1,223,461. Divided and this application filed February 15, 1917. Serial No. 148,825.

*To all whom it may concern:*

Be it known that I, JOHN WILLIS, a citizen of the United States, residing at Kane, in the county of McKean and State of Pennsylvania, have invented certain new and useful Improvements in Sand-Grading Apparatus for Glass - Grinding Machinery, of which the following is a specification.

My invention relates to improvements in apparatus for grading or classifying abrasive for plate glass grinding mechanism. It has in view to provide a secondary grader comprising a series of settling chambers or compartments, separated by partitions, through and over which the water and sand in suspension pass in their circulation, openings in the partitions being so arranged as to effect a sinuous or alternating zig zag course throughout the series of settling chambers, surplus water passing off by an overflow conduit leading to the ditch of the tables or to any other suitable point of discharge.

The settling chambers are provided with conduits for carrying off the abrasive and water and for delivering the same to the table as hereinafter described, and the invention has in view to provide, within a comparatively restricted area, for a material retardation of the current, whereby to effect precipitation of the abrasive by gravity, and its selection by the agency herein described.

The present invention forms divisional subject matter of that disclosed in my prior application filed October 18th, 1915, Ser. No. 56,348.

The invention is illustrated in the accompanying drawings, in which—

Figure 1 is a plan view of an apparatus utilizing my invention showing it in connection with the usual plate glass grinding table.

Fig. 2 is a plan view showing a series of classifying chambers constructed to provide for the alternating retarding circulation of the water and abrasive.

Fig. 3 is a cross-sectional view indicated by the line III, III, of Fig. 2.

Various processes have been utilized, in connection with the art of grinding plate glass and other material, for the classifying or separation of the abrasive used, which is usually sand, into various grades of coarseness.

It is desirable in the grinding operation to supply the coarsest sand for the first rough grinding operation, usually requiring the longest treatment. The successively finer grades are then furnished, with water, finishing the grinding operation prior to the emery treatment.

Sand has been customarily used for this work for many years; the fine sands were collected in sand pits, into which they were deposited from a stream flowing from the table over barriers, similar to the well-known sluice box method. Other apparatus has been designed and processes have been used utilizing upward flow of water for the purpose of separating the sand into various grades or strata, in suspension, the sand then being taken off from the various levels, and used on the table, or stored for future use as needed.

Sand, by its nature, tends to settle into compact masses by gravitation through a quiescent mass or body of water, or to remain in suspension in the presence of an opposing upward current. It may be carried along in a horizontal stream, from which it will precipitate by gravity, depending on the rate of flow of the current, depth of fall, etc. The latter is merely an illustration of well-known phenomena of nature, in connection with the beds of streams or rivers.

In my invention, I utilize the gravitating tendency of sand in a quiescent body of water, or in a horizontally flowing stream, tending to first deposit the heavier and larger grains, and successively those of smaller and lighter size and weight, by precipitation. I have utilized for such purpose a series of compartments or chambers through which a stream of water carrying the sands in suspension is caused to circulate in its course from the grinding table and eventually back thereto, and I employ means for positively removing and supplying the sand as needed from the various collecting agencies to the glass grinding table.

In my present improvement I utilize, in connection with the classifying chambers and the horizontally traveling stream therethrough and thereover, an apertured partition construction whereby the water and sand are caused to circulate throughout the area, or from one side or end to the other, of the first compartment, then passing through a suitable opening at one end of the intervening partition into the next compartment, through which it circulates in a reverse direction, passing through an opening in the next compartment diagonally arranged as to the first opening, the circulation thus continuing throughout the several compartments in an alternating flow. Its speed of movement is thereby correspondingly and proportionately decreased, and thus proportionately causes a more rapid precipitation of the suspended sands, as the horizontal stream passes sluggishly through the several collecting chambers.

Referring to the accompanying drawings, showing one preferred embodiment of the invention, 2 represents the usual glass grinding table rotatably mounted upon any suitable support having the usual surrounding collecting gutter for the centrifugally discharged sands and water, leading backwardly to a screen 4 which is interposed in the course of flow to the preliminary receiving pit or chamber 5.

Superimposed above the rotatable table 2 are the usual grinding runners 6, 6, of well-known construction, underneath which the glass plates are rotated by the table 2, in connection with the supply of abrasive and water, and the customary shoes of the runner.

A distributing trough 7 of any suitable construction is usually located above the table at or about its middle portion, whereby to distribute the sands and water to the table, and between the runners, as it is delivered to the trough by either one of the conveying pipes hereinafter described.

The preliminary receiving chamber 5 is located, as shown in Fig. 1, adjacent to the table and to the circulation channel therefrom, to receive all of the water and sand as it is washed off from the table, and to also receive additional quantities of fresh coarse sand from time to time. For such latter purpose, a coarse sand box or bin 8 is located at any convenient position and elevation, whereby coarse sand may be delivered by conduit 9, leading to screen 4, in connection with a stream of water from a hose, whereby to deliver fresh sand into the circulation and the primary pit 5 of preliminary grader A.

Such sand, with the water from the table, together with the already used sands washed therefrom, are thus all discharged into the preliminary chamber 5, in which the coarsest and heaviest sand will fall to the bottom.

The lighter and finer sands, comprising the various grades to be classified by the latter treatment, pass horizontally over an intervening partition 10, into an adjacent chamber 11, from which leads a suitable overflow 12 at any convenient point, so as to avoid flushing of the chambers 5 and 11.

The said chambers, as thus constructed, form a primary grader by which the sands are initially separated into two grades, to-wit, coarse sand; and all finer sands which are sufficiently light and small to be carried over the top of partition 10, by the horizontally moving stream.

The coarse sands thus collected in chamber 5, are removed therefrom by any suitable means, as an air lift pump having a supply pipe leading to the distributing trough 7 at the middle portion of the table. The air lift pump, if used, is provided with the usual air supply line for the purpose of actuating the pump.

All of the finer grades of sand collected in compartment 11, which are intended for use when re-classified into their several sub-grades, are in a similar manner carried by pipe 16 and an air lift pump over to the secondary grader B.

The secondary grader B, like primary grader A, is also located in convenient relation to the rotatable table 2 for distribution of the sands thereto, and comprises a series of sluice boxes or collecting chambers $bbb$, $bbb'$, $bbb^2$, $bbb^3$, preferably arranged consecutively, one beyond the other, separated by intervening partitions $19^b$, $20^b$, and $21^b$, respectively, of substantially the same height, each having an overflow passage 39 through the upper end portion of each of said partitions. These passages alternate in position, whereby to effect a zig zag or alternating flow of the horizontal current from one of said compartments to the other throughout the entire series.

By this means, and by also spacing the several partitions at successively increasing distances apart, if desired, as shown, I insure increasing width of the channel through the upper portions of the compartments successively, which, in addition to the alternations of the current itself in direction, thereby effects the desired gradual reduction in speed of travel and the resulting precipitation of the sands into the several compartments.

By collecting the several grades of sand by natural precipitation through practically still or quiescent bodies of water into which they are deposited through and from a superimposed horizontally flowing stream of gradually decreasing speed, I utilize the natural gravitating tendency of the sand, as controlled by its size and weight, and thereby insure the collection of a series of grades of successively reduced size and weight, for utilization in the same order, without the necessity of resorting to any artificial or forced separation, suspension, or precipitation of the several grades, by the use of vertical flow currents, or other devices commonly employed in this art.

Pipe 16 discharges the sands and water by pump action from chamber 11 into the first compartment bbb, a surrounding housing box or cover 22 being preferably employed to prevent splashing and insuring the depositing of all of the water and sands into the first chamber.

At its other end an overflow passage 23 leads from the last collecting chamber $bbb^3$ by a suitable trough back to the space surrounding the table and by gutter 3 to the circulation.

For the purpose of facilitating precipitation of the finer sands through the substantially quiescent lower water of the several chambers it is desirable that the longitudinal travel through their upper portions of the main horizontally traveling stream shall be as long and slow as possible, and that the speed of the current shall be appreciably retarded or lessened. This effect is produced by the arrangement above described.

The flow through the initial chamber bbb facilitates the depositing of the sands of the desired fineness, being the coarsest of the assembled fine sands, into the first compartment, all of the remaining sands passing over the first barrier or partition $19^b$ through opening 39.

Continued travel of the current over the successive compartments and the intervening barriers, diagonally across the upper portion of each chamber traveling at successively and relatively slower rates of speed in its passage toward the endmost compartment, effects precipitation of the sands by gravity and their collection in the several compartments.

Their bottoms, as shown in Fig. 3, are preferably sloped downwardly toward their middle portion and each chamber is connected with an outlet pipe 26, which in turn, is connected with a manifold pipe 30 leading to pump 31, driven by motor 32.

A delivery pipe 33 leads from pump 31 over to the middle portion of the table, where the sand and water drawn from any particular compartment of the secondary grader is positively discharged into trough 7 and therefrom to the table.

The collecting compartments of the various chambers of the secondary grader are preferably located below the level of the table 2, the upper portion of the grader being above the level of said table. In such arrangement the contents of the chambers must be positively removed from the several collecting chambers and carried upwardly sufficiently high to be discharged upon the table, which function is performed by the motor-actuated pump 31.

Each of the connecting pipes 26 leading to manifold 30 is provided with a controlling valve 34 having an actuating lever 35 which may extend downwardly underneath the grader B for easy manipulation by the workman so as to enable him to open the valve of the particular connection desired according to the grade of sand to be supplied to the table.

For the purpose of flushing manifold pipe 30 or its branch connections 26 at any time, I provide a water supply system consisting of a main supply pipe 36 and manifold 37 having valve-controlled branch connections 38 leading to the several pipes mentioned, whereby either of such branch connections may be opened to supply a flushing flow of water to clear out the pipes, if necessary.

Ordinarily, the several grades of sands being deposited and graded will collect in the central bottom portion of each compartment and will be pumped therefrom and supplied to the table as noted, the overflow of water and any surplus sand being returned to the circulation in connection with other sand from the bin, from time to time.

By means of the construction of the secondary grader and tortuous circulation therethrough I insure an absolutely calm flow of the water from the first of the secondary compartments, the sand falling quietly and naturally into the interior. The construction also avoids the creation of any reverse or upward flow currents, thereby facilitating the action and insuring the quiescence of the contents of the tank.

The advantages of the invention are that it provides a system of sand grading utilizing natural forces by properly designing the primary and secondary graders and giving opportunity in the latter for ample time of precipitation.

The invention is comparatively simple in construction and economical to build and maintain in order. It performs its functions in a highly satisfactory manner as to the grading, facilitates and cheapens the grinding operations, and is at all times under the control of the operator while utilizing all of the coarse sand to destruction and providing for renewal of fresh sand during the grinding operation.

Having thus described my invention, what I claim is:—

1. Apparatus for classifying and supplying abrasive and water, comprising a sand grading apparatus provided with a series of settling compartments separated by continuous transverse intervening partitions having alternately and diagonally located circulation passages through their upper edge portions whereby to effect a tortuous flow throughout the series, means for supplying abrasive and water to the first of said compartments, means for carrying off overflow from the last of said compartments, and means for withdrawing abrasive and water from each compartment.

2. Apparatus for classifying and supplying abrasive to grinding and smoothing machines, comprising a primary grader adapted to receive water and abrasive, a secondary grader provided with a series of settling compartments separated by continuous transverse intervening partitions having alternately and diagonally located circulation passages through their upper edge portions, means for removing abrasive and water from the primary grader to the first settling compartment of the secondary grader, means for removing abrasive and water from the lower portion of each compartment of the secondary grader and delivering it to a point of use, and means for carrying off overflow from the last of said compartments.

3. Apparatus for classifying and supplying abrasive and water, comprising a primary grader adapted to receive water and abrasive, a secondary grader consisting of a series of successively arranged partitioned compartments, means for supplying sand and water from the primary grader to the first compartment of the secondary grader, means for withdrawing graded sand and water from each compartment separately and conducting the same to a point of use, and means for carrying off the overflow from the last of said compartments, the partitions or walls of the compartments being continuous and provided at their upper corner edge portions with circulation openings so located as to effect a zig zag or undulating flow of the water and sand in suspension throughout the upper portions of the several compartments with a resulting retardation of the current and accompanying precipitation of the sand.

In testimony whereof I hereunto affix my signature.

JOHN WILLIS.